Sept. 11, 1923.
W. S. CUNNINGHAM
TRANSMISSION
Filed Sept. 8, 1921   3 Sheets-Sheet 1
1,467,923
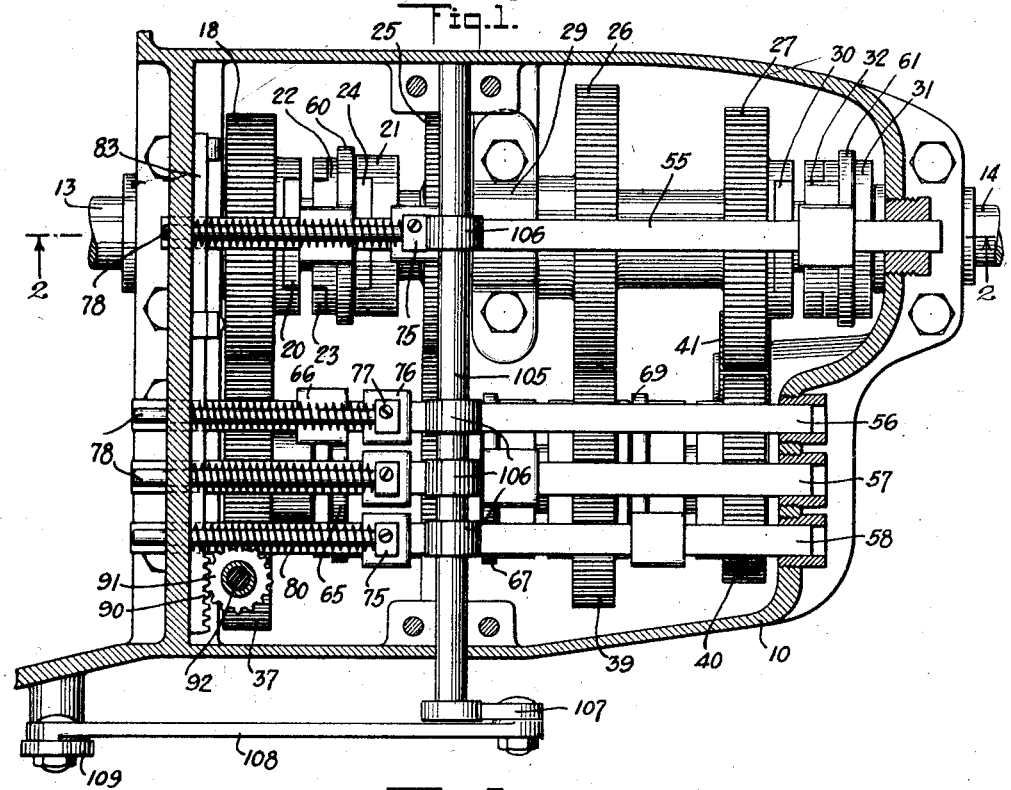
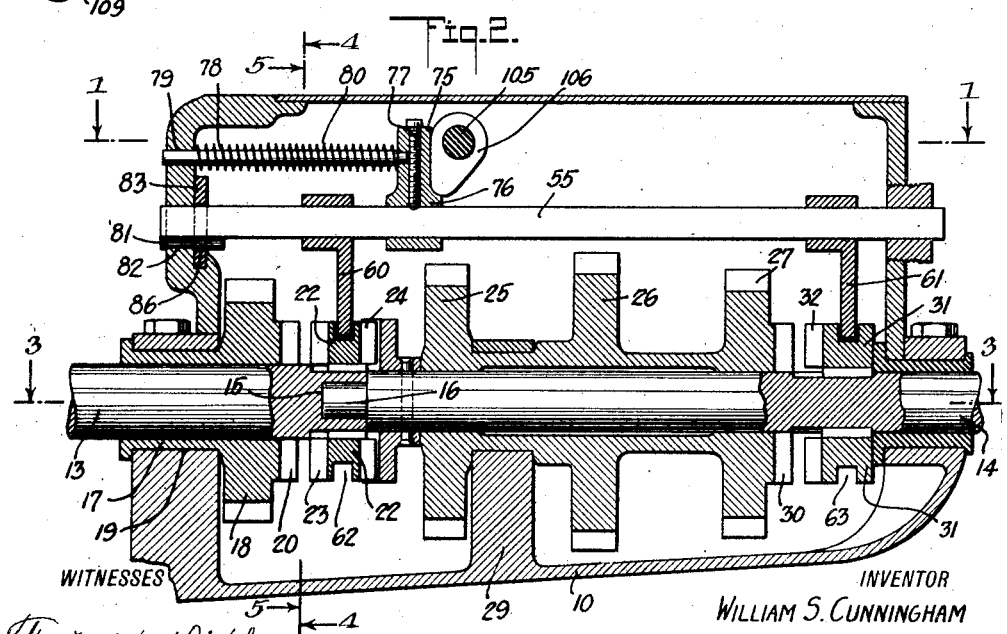
WITNESSES
Frederick Diehl.
Hugh H. Ott
INVENTOR
WILLIAM S. CUNNINGHAM
BY
ATTORNEYS

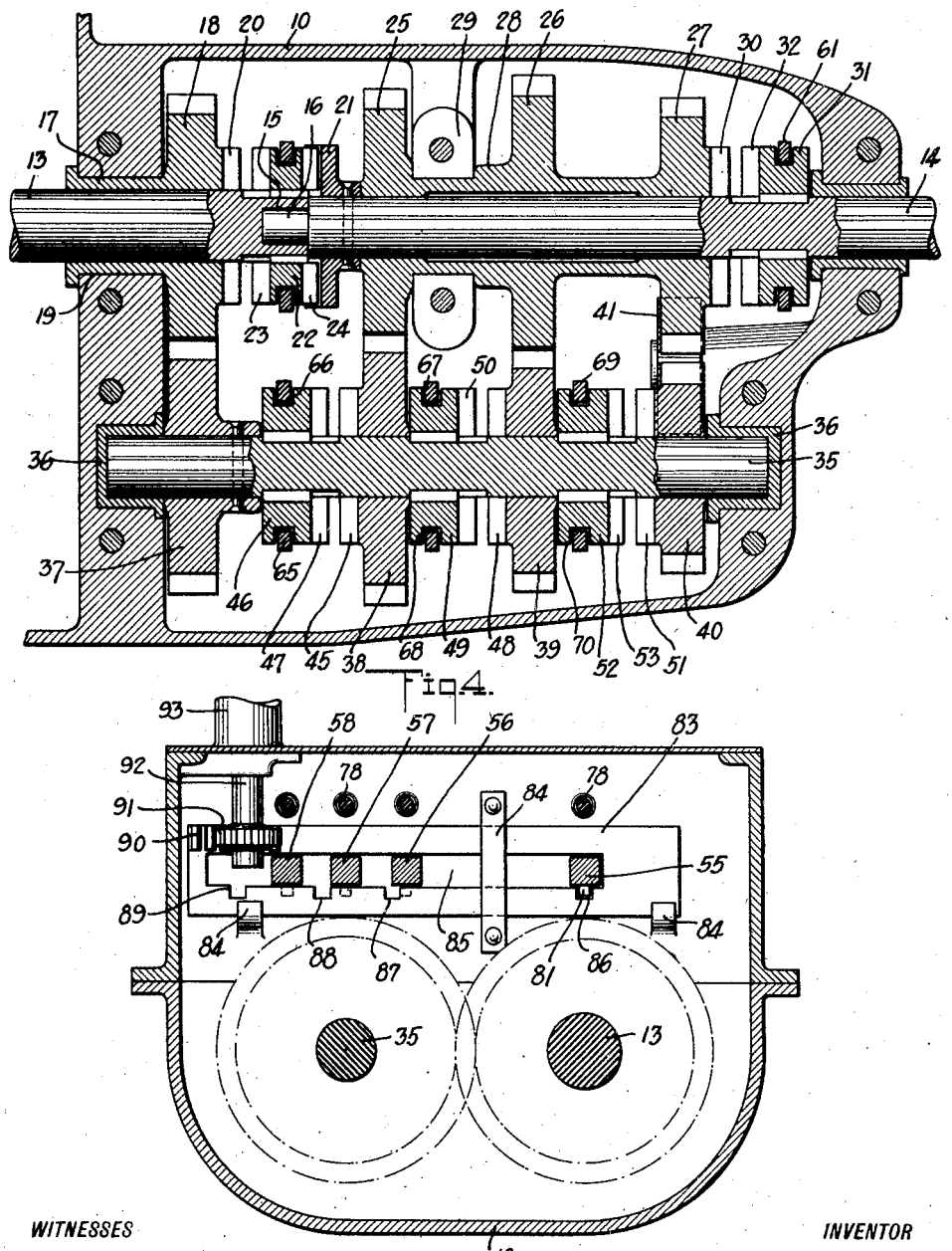

Sept. 11, 1923.
W. S. CUNNINGHAM
TRANSMISSION
Filed Sept. 8, 1921 3 Sheets-Sheet 3
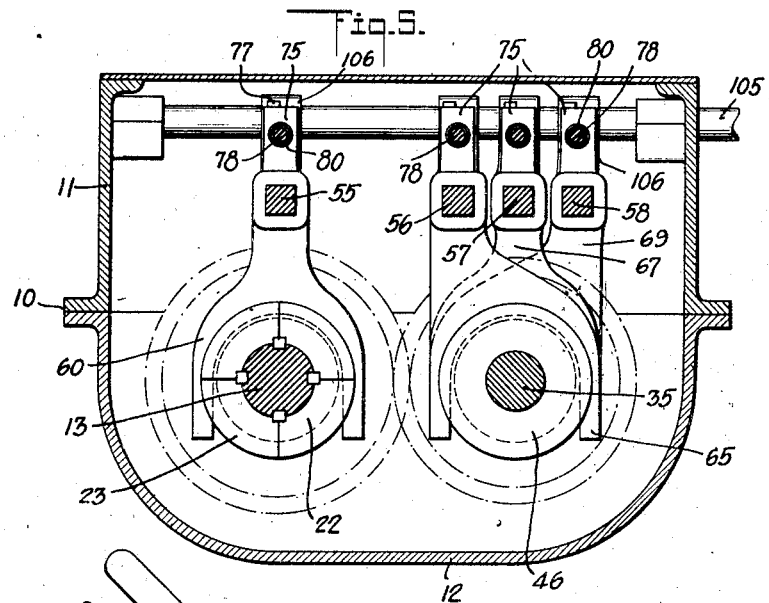
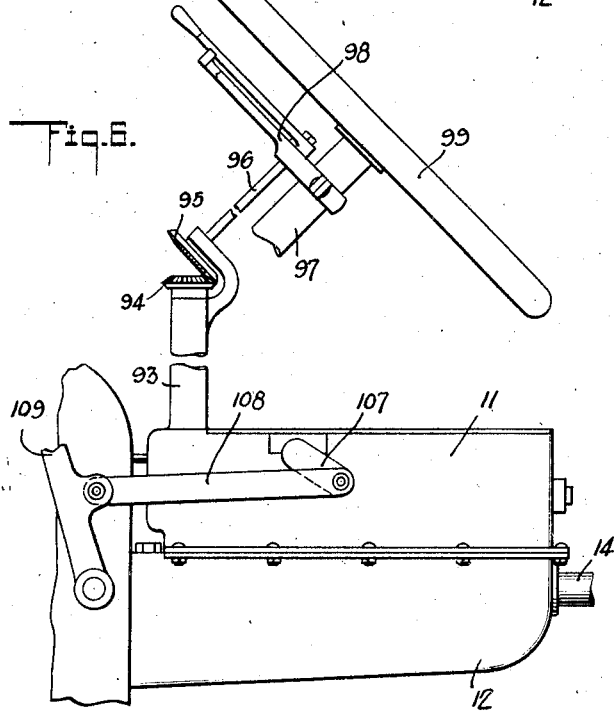
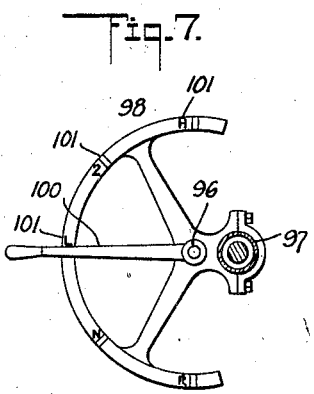
WITNESSES
INVENTOR
WILLIAM S. CUNNINGHAM
BY
ATTORNEYS Patented Sept. 11, 1923.

1,467,923

UNITED STATES PATENT OFFICE.

WILLIAM STANTON CUNNINGHAM, OF SHREVEPORT, LOUISIANA.

TRANSMISSION.

Application filed September 8, 1921. Serial No. 499,309.

*To all whom it may concern:*

Be it known that I, WILLIAM S. CUNNINGHAM, a citizen of the United States, and a resident of Shreveport, in the parish of Caddo and State of Louisiana, have invented a new and Improved Transmission, of which the following is a full, clear, and exact description.

This invention relates to a power transmission mechanism and refers more particularly to an improvement in variable speed transmission for motor vehicles or the like.

The invention contemplates a variable speed transmission which includes constantly meshing speed gears together with means for selectively rendering the same operative whereby to eliminate the necessity of shifting the gears into engagement and the resultant disadvantages incident thereto.

As a further object the invention contemplates a power transmission and speed changing mechanism which when the driving and driven elements are coupled for a direct drive eliminates the idling of the speed changing gears and counter shaft permitting said elements to remain at rest to reduce wear on said parts.

A further object in view resides in the provision of a variable speed transmission which includes a speed selecting means preferably mounted on the steering column within convenient reach of the operator's hand.

A further object in view resides in the provision of means which positively prevents shifting of the selective means without first disconnecting the drive element from the driven element.

A still further object in view resides in the provision of a variable speed transmission mechanism which includes removable elements, any one of which are readily replaceable at a minimum cost when worn.

With the above recited and other objects in view, the invention resides in the novel construction, set forth in the following specification, particularly pointed out in the appended claims and illustrated in the accompanying drawings, it being understood that the right is reserved to embodiments other than those actually illustrated herein to the full extent indicated by the general meaning of the terms in which the claims are expressed and by variations in the phraseology of the same.

In the drawings—

Figure 1 is a sectional plan view of a transmission constructed in accordance with the invention, the same being taken on the line 1—1 of Fig. 2.

Fig. 2 is a longitudinal sectional view taken approximately on the line 2—2 of Fig. 1.

Fig. 3 is a horizontal sectional view taken approximately on the line 3—3 of Fig. 2.

Fig. 4 is a transverse sectional view taken approximately on the line 4—4 of Fig. 2.

Fig. 5 is a similar view taken on the line 5—5 of Fig. 2.

Fig. 6 is a fragmentary side elevation illustrating the general assembly of the transmission with the complementary elements of a motor vehicle.

Fig. 7 is a plan view of the sector and control lever for the selective shifting means illustrating the same applied to the steering post of a motor vehicle.

Referring to the drawings by characters of reference, 10 designates a transmission housing having upper and lower sections 11 and 12 detachably secured together to admit of the assembly and access to the interior thereof. 13 and 14 designate respectively the drive shaft and driven shaft, the former being operatively associated with the engine or prime mover, not shown, and the latter connected to the drive wheels of the vehicle. The said shafts are disposed in axial alignment extending longitudinally through the housing 10. The drive shaft 13 is provided with a concentric bearing opening or rest 15 at its inner end to receive the concentric trunnion 16 of the driven shaft 14 projecting from the inner end of said driven shaft whereby positive axial alignment of said shafts is insured. The drive shaft extends through the sleeve 17 of a gear 18 loosely mounted on the drive shaft with the sleeve loosely mounted in the bearing 19 in the end wall of the housing 10, said gear 18 is provided on its inner face with a clutch member 20. The inner or forward extremity of the driven shaft 14 is provided with a clutch member 21 confronting and suitably spaced from the clutch member 20. The inner or rear extremity of the drive shaft has splined thereon a double faced sliding clutch member 22 provided on its opposite sides with the clutch teeth 23 and 24. A driven speed gear unit consisting of driven speed gears 25, 26 and 27 integrally cast or otherwise secured on a hollow shaft 28, is loosely mounted on the driven shaft in rear of the clutch member 21, said sleeve being mounted in a bearing 29 to prevent longitudinal relative movement of the same within the housing. The rear extremity of the hollow shaft 29 of the driven speed gear unit is provided with clutch teeth 30. An axially shiftable clutch member 31 having clutch teeth 32 confronting the clutch teeth 30 is splined on the drive shaft 14 in rear of the driven speed gear unit. A counter shaft 35 is disposed longitudinally within the housing at one side of the shafts 13 and 14 and parallel thereto, the same being supported at its opposite ends in the bearings 36 mounted in the opposite end walls of the housing. A gear or pinion 37 is keyed on the counter shaft at the forward end thereof, the teeth of the same meshing with the teeth of the gear 18. Drive gears or pinions 38, 39 and 40 are loosely mounted on the counter shaft in spaced relation with the teeth thereof respectively meshing with the teeth of the driven speed gears 25 and 26 and the teeth of an idler gear 41, which in turn meshes with the teeth of the driven speed gear 27. The pinion 38 is provided on its forward side face with clutch teeth 45. The axially shiftable clutch member 46 is splined on the counter shaft and interposed between the pinions 37 and 38, the same being provided on its rear face with clutch teeth 47. The pinion 39 is provided on its forward side face with clutch teeth 48 and an axially shiftable clutch member 49 having clutch teeth 50 on its rear face is splined on the counter shaft and interposed between the pinions 38 and 39. The pinion 40 is provided on its forward side face with clutch teeth 51 and an axially shiftable clutch member 52 having clutch teeth 53 on its rear face is splined on the counter shaft and interposed between the pinions 39 and 40. The pinion 38 and driven gear 25 constitute an intermediate speed driving ratio, the pinion 39 and driven gear 26 constituting the low speed ratio and the pinion 40, idler 41 and driven gear 27 constitute the reverse drive. The mechanism for selectively coupling the drive and driven shafts 13 and 14 consist of a plurality of longitudinal shiftable selector bars 55, 56, 57 and 58 having their opposite extremities respectively mounted in the end walls of the housing. The selector bar 55 is arranged in superposed relation to the drive and driven shafts 13 and 14 and has secured thereto shifting forks 60 and 61 which depend therefrom and respectively engage in the grooves 62 and 63 of the clutch members 22 and 31 whereby said clutch members will be simultaneously shifted in the same direction upon shifting of the selector bar 55. The selector bars 56, 57 and 58 are arranged parallel in superposed relation to the counter shaft. The selector bar 56 is provided with a depending shifting fork 65 received by the groove 66 in the clutch member 46. The selector bar 57 is provided with a depending shifting fork 67 which is received by the groove 68 in the clutch member 49. The selector bar 58 is provided with a depending shifting fork 69 which is received by the groove 70 in the clutch member 52. Each selector bar is provided with an upstanding lug 75 having a squared head 76 at its lower end conforming to the size and shape of the selector bar and longitudinally adjustable thereon and secured in adjusted position by a set screw 77. Each lug 75 is provided with a forwardly projecting guide rod 78, the forward extremity of which extends through an opening 79 in the front wall of the housing. A coiled compression spring 80 surrounds the guide rod and is interposed between the lug 75 and the inner surface of the front wall of the housing, but normally effecting rearward shifting of the selector bars. The forward extremity of each selector bar is provided with a depending rib or key 81 which conforms with and is received by the keyhole slot 82 in the front wall of the housing. A laterally shiftable selector plate 83 is mounted in the guide members 84 on the rear surface of the front wall of the housing. The selector plate is provided with a longitudinal slot 85 having suitable spaced depending key recesses 86, 87, 88 and 89 communicating therewith. The selector plate is provided on its rear face with rack teeth 90 which mesh with the teeth of a pinion 91 mounted on a vertical shaft 92 extending through the upper wall of the housing and a bearing column 93.

The upper extremity of the shaft 92 has keyed thereon a beveled pinion 94 which meshes with a beveled gear 95 secured or keyed to the lower extremity of an angularly disposed operating shaft 96 extending parallel to the steering column 97. The upper extremity of the operating shaft 96 extends through a sector plate 98 clamped or otherwise secured on the steering column immediately below the steering wheel 99 and the manipulating handle or lever 100 is secured to the upper extremity of the shaft 96 and coacts with the indicia 101 on the sector plate to permit the operator to properly shift the selector plate to obtain the desired speed or drive. A common clutch actuating shaft 105 is mounted transversely within the housing and has secured thereon a plurality of cams 106 corresponding in number and position to the lugs 75 of the selector bars. One extremity of the shaft 105 projects through the side of the housing and is provided with a crank arm 107, the free extremity of which is connected by a link 108 to the clutch pedal 109.

In operation to change the speed ratio or obtain a reverse drive, the clutch pedal 109 is pressed forward in the usual manner by the operator thereby drawing on the link 108 and crank 107 to turn the shaft 105. The turning of the shaft 105 will effect simultaneous forward shifting of all of the selector bars 55, 56, 57 and 58 against the action of the springs 80 through the engagement of the cams 106 with the upstanding lugs 75, thereby bringing the rear ends of the keys or ribs 81 forward of the selector plate to permit of lateral shifting of the same. In this position of the selector bars, the operator by means of the lever 100 may shift the selector plate to bring any one of the key recesses 86, 87, 88 or 89 in a position to register with the keys or ribs 81 on any of the selector bars. In this position of the selector bars all of the clutch teeth of the various clutch members and gears will be out of engagement whereby all of the driven elements of the transmission will be at rest. When the selector plate has been shifted to bring the key recess therein into registry with the key or rib 81 of the desired selector bar, the pedal 109 is released, thereby permitting the spring 80 of the desired selector bar to effect the retrograde movement of the shaft 105. The arrangement of the key recesses is such that when one registers with the key of one selector bar, to permit of its passage therethrough, the remainder will be out of registry to obstruct the shifting of the remaining selector bars. It will thus be seen that only the selected selector bar will be shifted rearwardly when the clutch pedal is released.

From the foregoing it is obvious that to obtain a direct drive, the clutch pedal will be pressed forward and the selector bar will be shifted by means of the manipulating handle 101 to bring the key recess 86 in registry with the key 81 of the selector bar 55; when this is accomplished the clutch pedal is released and the selector bar 55 under the action of the spring 80 will be shifted rearwardly thereby through the medium of the shifting forks 60 and 61 bringing the clutch teeth 24 of the clutch member 22 into engagement with the teeth of the clutch member 21 to directly couple the drive shaft 13 with the driven shaft 14. In this arrangement the gear 18, pinion 37, the driven speed unit, the drive pinions 38, 39 and 40 and the idler 41, together with the counter shaft 35 will be at rest in order to a great extent eliminate wear on these elements, as the majority of the driving is done in direct or high speed. To obtain the driving of the driven shaft in intermediate or second speed, the clutch pedal is again operated, thereby shifting the selector bar 55 forward until its key 81 is disposed in advance of the selector plate; the manipulating handle 101 is then shifted to arrange the same adjacent the indicia on the sector plate marked "2" in Figure 7 of the drawing; this will bring the key recess 87 into registry with the path of movement of the key 81 of the selector bar 56 simultaneously throwing the key recess 86 out of registry with the key 81 of the selector bar 55. The forward movement of the selector bar 55, by the operation of the clutch pedal will disengage the clutch teeth 24 from the teeth of the clutch member 21 and engage the clutch teeth 23 of the clutch member 22 with the clutch teeth 20 of the gear 18 and simultaneously bring the clutch teeth 32 into engagement with the clutch teeth 30 of the driven speed unit, thereby coupling the drive shaft 13 with the gear 18 and the driven shaft 14 with the driven speed gear unit. The coupling of the drive shaft 13 with the gear 18 will operate the gear 18, which in turn will drive the counter shaft 35 through the medium of the pinion 37, the teeth of which mesh with the gear 18. Under this arrangement the counter shaft will be idling while the pinions 38, 39 and 41, the idler 41 and the driven speed gear unit will be at rest. Immediately upon releasing the clutch pedal, the selector bar 56 will be shifted rearwardly, while the remaining selector bars will be held against rearward shifting by the engagment of their keys 81 with the selector plate. It will thus be seen that the rearward shifting of the selector bar 56 will move the shifting yoke 65 therewith to effect the engagement of the clutch teeth 47 of the clutch member 46 with the clutch teeth 45 of the intermediate or second speed pinion 38. The meshing of the teeth of the pinion 38 with the gear 25 will effect rotation of the driven speed gear unit at intermediate speed, and it follows that the previously engaged clutch teeth 30 and 32 of the driven speed gear unit and the clutch member 31 will drive the driven shaft 14 at intermediate speed. To drive the driven shaft 14 at low speed, the clutch pedal 109 is again operated to shift the selector bar 56 forward until its key 81 is disposed in advance of the selector plate; the manipulating handle 100 is then shifted to register with the indicia 101 of the sector plate marked L, thereby bringing the key recess 88 into registry with the path of movement of the key 81 of the selector bar 57 and throwing the key recess 87 out of registry with the path of movement of the key 81 of the selector bar 56. It thus follows that when the clutch pedal 109 is released the selector bar 57 will be shifted rearwardy together with the shifting fork 67 and the clutch member 49 to engage the clutch teeth 50 with the clutch teeth 48 of the pinion 39. The meshing of the teeth of the pinion 39 with the teeth of the gear 26 of the driven speed gear unit and the interengagement of the clutch teeth 30 and 32 will effect the driving of the driven shaft 14 at low speed. To obtain reverse driving of the driven shaft 14, the clutch pedal is operated to shift the selector bar 57 forward, to permit of lateral shifting of the selector plate 83 to bring the key recess 89 into registry with the path of movement of the key 81 of the selector bar 58 which will move rearwardly under the action of the spring 80 when the clutch pedal is released to bring the teeth 53 and 51 and the clutch member 52 and pinion 40 into engagement. It follows that the meshing of the teeth of the idler 41, which in turn mesh with the teeth of the gear 27 will effect reverse driving of the driven shaft. To obtain a neutral position, the manipulating lever 100 will be arranged, when the clutch pedal is depressed to correspond with the indicia marked N, in which position all of the key recesses will be out of registry with the paths of movement of the keys of all of the selector bars so that when the clutch pedal is released the counter shaft will be idling and the driven speed gear unit and driven shaft will be at rest. It is, of course, obvious that when any one of the selector bars are shifted rearwardly, its key lying within its respective recess will prevent shifting of the selector bar thus forcing the operator to throw out the clutch before changing speeds. In practice it is preferable to construct the gears and the clutch teeth carried thereby of case hardened steel, while the clutch members will preferably be of a softer material, whereby any wear will obtain on the clutch members which may be replaced at a lower expense than the gears. Due to the fact that the gears themselves are not shifted but are constantly in mesh, the possibility of stripping the teeth of the gears is positively eliminated.

Having thus described my invention, what I claim is:

1. The combination with a variable speed transmission, which includes drive, driven and counter shafts and a speed changing mechanism comprising a plurality of independently operable elements means for normally coupling said elements with the counter shaft, a speed changing unit loosely mounted on the driven shaft having a plurality of complementary speed changing elements constantly engaging the counter shaft speed changing elements, and means normally operable to couple the drive and driven shafts for direct driving and for simultaneously effecting uncoupling of the driven shaft speed changing elements and uncoupling the counter shaft from the drive shaft, of mechanism for normally holding all of said means inactive, and manually operable to selectively release each of said means.

2. In a transmission, driving and driven members, a speed changing mechanism including a counter shaft having a plurality of independently operable speed changing elements loosely mounted thereon, a speed changing unit loosely mounted on the driven member having a plurality of complementary speed changing elements in constant engagement with the first mentioned speed changing elements, means operable upon movement in one direction to couple the driving and driven members for direct driving, and operable upon movement in the opposite direction to uncouple the same member and couple the driving member with the counter shaft and the speed changing unit with the driven member, in combination with selective means for coupling the speed changing elements with said counter shaft.

3. In a transmission, a drive shaft, a counter shaft and a driven shaft, complementary speed changing elements on the counter and driven shafts, means operable upon movement in one direction to establish direct driving connection between the drive and driven shafts, and operable upon movement in the opposite direction to break said direct driving connection and simultaneously effect driving of the counter shaft and coupling of all of the speed changing elements on the driven shaft with said driven shaft, and independently operable selective means for coupling the complementary speed changing elements of the counter shaft with said counter shaft to obtain driving of the driven shaft at various rates of speed.

4. A transmission including a drive shaft having a loosely mounted gear thereon, a counter shaft having a pinion secured thereon and meshing with said gear, a plurality of speed changing pinions loosely mounted for independent rotation on the counter shaft, a driven shaft having a speed gear unit loosely mounted thereon including complementary speed changing gears in constant mesh with the speed changing pinions, means operable upon movement in one direction to couple the drive and driven shafts for direct driving and operable upon movement in the opposite direction to couple the drive shaft gear with said drive shaft to operate the counter shaft and to couple the speed gear unit with the driven shaft simultaneously, and independent means for selectively coupling the speed changing pinions with the counter shaft to obtain driving of the driven shaft at various rates of speed.

5. The combination with a variable speed transmission, which includes drive, driven and counter shafts and a speed changing mechanism comprising a plurality of independently operable elements means for normally coupling said elements with the counter shaft, a speed changing unit loosely mounted on the driven shaft having a plurality of complementary speed changing elements constantly engaging the counter shaft speed changing elements, and means normally operable to couple the drive and driven shafts for direct driving and for simultaneously effecting uncoupling of the driven shaft speed changing elements and uncoupling the counter shaft from the drive shaft, of mechanism for normally holding all of said means inactive, and manually operable to selectively release each of said means, said mechanism comprising a laterally shiftable plate having a slot and spaced notches in the edge of the material defining said slot, and lugs on the respective coupling means which are released by the notches when registered therewith.

6. The combination with a variable speed transmission, which includes drive, driven and counter shafts and a speed changing mechanism comprising a plurality of independently operable means for normally coupling said elements with the counter shaft, a speed changing unit loosely mounted on the driven shaft having a plurality of complementary speed changing elements constantly engaging the counter shaft speed changing elements, and means normally operable to couple the drive and driven shafts for direct driving and for simultaneously effecting uncoupling of the driven shaft speed changing elements and uncoupling the counter shaft from the drive shaft, of mechanism for normally holding all of said means inactive, and manually operable to selectively release each of said means, said mechanism comprising a laterally shiftable plate having a slot and spaced notches in the edge of the material defining said slot, lugs on the respective coupling means which are released by the notches when registered therewith, and a common device for returning said means to a position to be held by said plate.

WILLIAM STANTON CUNNINGHAM.